United States Patent
Owen

(10) Patent No.: US 11,619,051 B2
(45) Date of Patent: Apr. 4, 2023

(54) WALKWAY INSTALLATION HAVING A HANDRAIL CONNECTOR

(71) Applicant: KEE SAFETY LIMITED, Cradley Heath (GB)

(72) Inventor: Stuart Owen, Stourbridge (GB)

(73) Assignee: KEE SAFETY LIMITED, West Midlands (GB)

( * ) Notice: Subject to any disclaimer, the term of this patent is extended or adjusted under 35 U.S.C. 154(b) by 87 days.

(21) Appl. No.: 17/259,474

(22) PCT Filed: Jul. 9, 2019

(86) PCT No.: PCT/GB2019/000095
§ 371 (c)(1),
(2) Date: Jan. 11, 2021

(87) PCT Pub. No.: WO2020/012147
PCT Pub. Date: Jan. 16, 2020

(65) Prior Publication Data
US 2021/0293028 A1    Sep. 23, 2021

(30) Foreign Application Priority Data

Jul. 13, 2018   (GB) .................................... 1811514

(51) Int. Cl.
*E04F 11/18*   (2006.01)
*E04D 13/12*   (2006.01)

(52) U.S. Cl.
CPC .......... *E04F 11/1812* (2013.01); *E04D 13/12* (2013.01); *E04F 2011/1889* (2013.01)

(58) Field of Classification Search
CPC ........... E04F 11/1812; E04F 2011/1889; E04F 11/1817; E04F 11/025; E04F 11/06;
(Continued)

(56) References Cited

U.S. PATENT DOCUMENTS 524,661 A * 8/1894 Austin .................... E06C 1/345
                                                    182/156
5,188,342 A   2/1993 Ouellette et al.
(Continued)

FOREIGN PATENT DOCUMENTS

DE   195 14 393    10/1996
EP   1 293 686     3/2003
(Continued)

OTHER PUBLICATIONS

International Search Report for PCT/GB2019/000095 dated Dec. 9, 2019, 5 pages.
(Continued)

*Primary Examiner* — Patrick J Maestri
(74) *Attorney, Agent, or Firm* — Nixon & Vanderhye

(57) ABSTRACT

A walkway installation includes a walkway assembly which includes at least one tread module supported by a pair of spaced apart elongate supports which extend in the direction of the length of the walkway installation, the walkway installation additionally including a handrail assembly including a handrail which extends in the direction of the length of the walkway assembly and a plurality of spaced apart posts which each secure the handrail relative to the walkway assembly, the handrail assembly additionally including a first connector which secures a post to one side of the walkway assembly and the first connector having secured thereto a substantially inflexible transverse link which extends across the walkway assembly in a direction perpendicular to the length of the walkway installation, the transverse link extending to a second connector secured to the other side of the walkway.

20 Claims, 9 Drawing Sheets

(58) Field of Classification Search
CPC .. E04D 13/12; E04G 1/15; E04G 5/10; E04G 5/14; E04G 27/00
See application file for complete search history.

(56) References Cited

U.S. PATENT DOCUMENTS

| | | | | |
|---|---|---|---|---|
| 8,595,989 | B1* | 12/2013 | Greene | E04H 7/065 |
| | | | | 52/192 |
| 9,279,256 | B2 | 3/2016 | Greaves et al. | |
| 10,323,422 | B1* | 6/2019 | Eddy | E04G 7/00 |
| 2003/0094604 | A1* | 5/2003 | Higgs | F16B 7/0486 |
| | | | | 256/65.01 |
| 2008/0006809 | A1 | 1/2008 | Stoffels et al. | |
| 2013/0000231 | A1 | 1/2013 | Greaves et al. | |
| 2014/0150188 | A1* | 6/2014 | Allen | E04F 11/1865 |
| | | | | 256/65.03 |
| 2016/0032600 | A1* | 2/2016 | So | E04G 5/067 |
| | | | | 182/222 |
| 2016/0340918 | A1* | 11/2016 | Hollis | E04G 7/28 |
| 2017/0342727 | A1* | 11/2017 | Newman | E04G 3/28 |
| 2019/0119923 | A1* | 4/2019 | Winter | E04F 11/002 |

FOREIGN PATENT DOCUMENTS

| | | |
|---|---|---|
| GB | 2 379 710 | 3/2003 |
| GB | 2475914 | 6/2011 |
| GB | 2478564 | 9/2011 |
| WO | 00/26486 | 5/2000 |

OTHER PUBLICATIONS

Written Opinion of the ISA for PCT/GB2019/000095 dated Dec. 9, 2019, 8 pages.
Kee Safety LLC, "Safe working platform for fragile roofs", YouTube Video, Jul. 27, 2016, https://www.youtube.com/watch?v=_BbR9b-QDeM, XP054979893, 32 pages.
Search Report for GB1811514.7 dated Dec. 20, 2018, 1 page.
Search Report for GB 1908084.5 dated Nov. 22, 2019, 1 page.

* cited by examiner

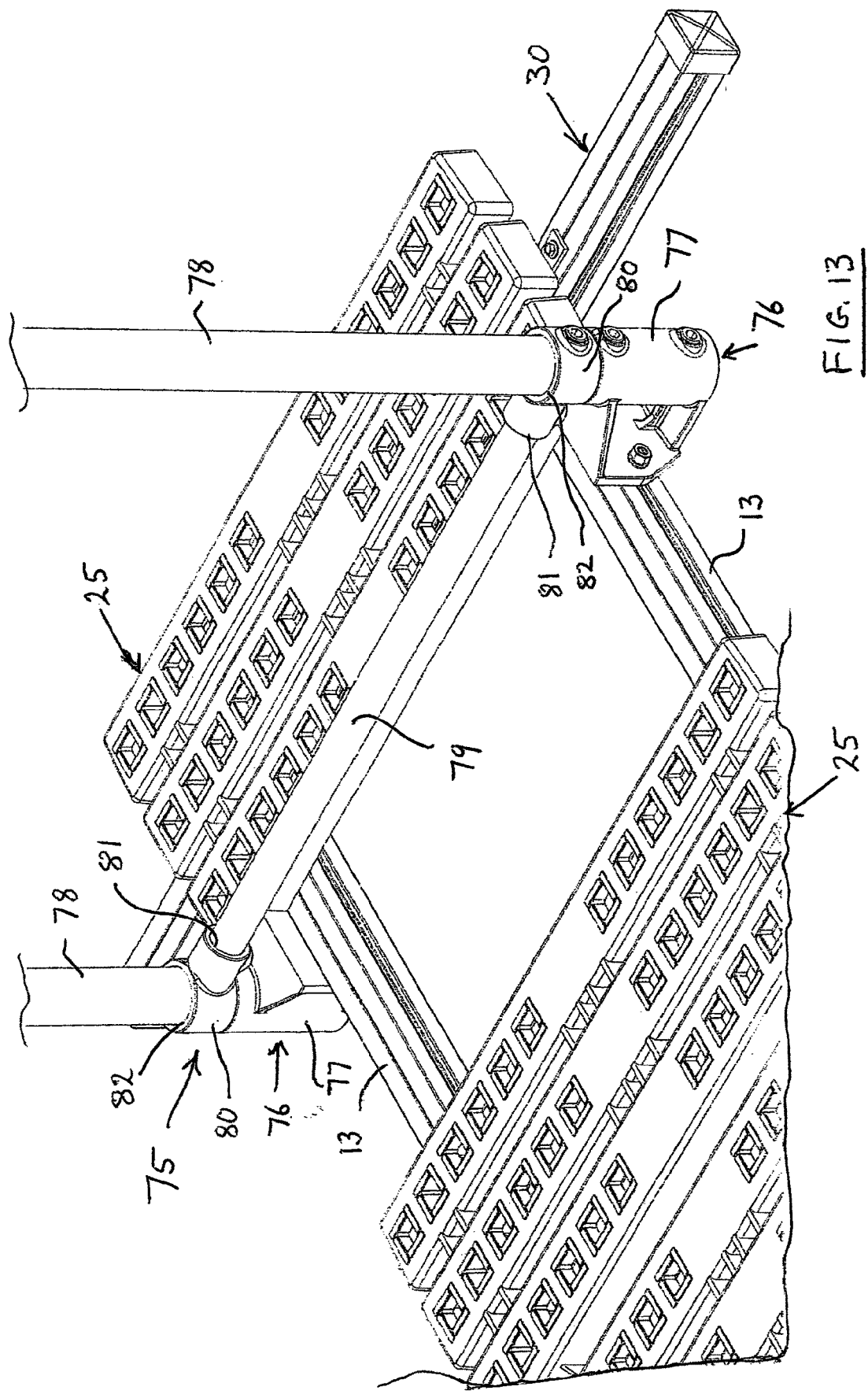

WALKWAY INSTALLATION HAVING A HANDRAIL CONNECTOR

CROSS-REFERENCE TO RELATED APPLICATIONS

This application is the U.S. national phase of International Application No. PCT/GB2019/000095 filed Jul. 9, 2019 which designated the U.S. and claims priority to GB 1811514.7 filed Jul. 13, 2018, the entire contents of each of which are hereby incorporated by reference.

BACKGROUND OF THE INVENTION

Field of the Invention

This invention relates to a handrail assembly, a walkway installation comprising a handrail assembly, and a connector for use in securing a handrail to a walkway.

Description of the Related Art

For pedestrian walkways provided at exposed locations, typically at elevated locations or in proximity to hazardous material, it is desirable to provide a handrail assembly that acts as a barrier to restrain personnel from falling from the walkway.

If the walkway is provided at a location which is away from a wall or other such structure to which a handrail may be directly secured it is necessary to secure the handrail to posts that in turn are secured to appropriate supports such as that of a roof structure or the walkway.

Securing a handrail post directly to a roof structure can provide a firm location for the handrail but achieving a strong and watertight connection often cannot be readily and reliably accomplished. In particular, attaching directly to the roof structure creates a risk of undue localised loading of the roof structure and associated risk that the integrity of a watertight connection might be compromised.

The alternative of attaching a post to the walkway avoids the need for puncturing of the roof material but does require that the walkway is of sufficient strength to provide a firm location of handrail posts such that they are able sufficiently to resist sideways loading of a handrail. Because of the general desirability, particularly for rooftop installations, for the walkway to be of a low weight that does not disadvantageously apply additional loading to the roof structure there is the potential problem that the walkway may have insufficient strength to provide adequate support for handrail posts. Thus the walkway may be of a lightweight design which, although comprising relatively low strength components, has sufficient strength and rigidity when the components are assembled together to provide mutual support for one another, for example to form a walkway assembly such as that described in the specification of our UK patent publication GB 2478564A. Thus a walkway assembly of that type of construction is not necessarily suitable for firmly supporting a handrail.

SUMMARY OF THE INVENTION

The present invention seeks to provide a walkway installation, a handrail assembly and a connector for a handrail post which mitigates or overcomes the aforedescribed difficulties.

In accordance with one aspect of the present invention a walkway installation comprises a walkway assembly which comprises at least one tread module supported by a pair of spaced apart elongate supports which extend in the direction of the length of the walkway installation, the walkway installation additionally comprising a handrail assembly comprising a handrail which extends in the direction of the length of the walkway assembly and a plurality of spaced apart posts which each secure the handrail relative to the walkway assembly, the handrail assembly additionally comprising a first connector which secures a post to one side of the walkway assembly and said first connector having secured thereto a substantially inflexible transverse link which extends across the walkway assembly in a direction perpendicular to the length of the walkway installation, said transverse link extending to a second connector secured to the other side of the walkway.

The first connector may be a component which is secured to a tread module which in turn is secured to one of the elongate tread module supports but preferably the first connector is a component which is secured directly to a first of the elongate supports.

The second connector may be a component which is secured to a tread module which in turn is secured to one of the elongate tread module supports but preferably the second connector is a component which is secured directly to a second of the elongate supports. As an alternative to use of a second connector which is a component secured to a second of the elongate supports, the second of the elongate supports may be adapted to serve as the second connector whereby, without an interposed connector, the second elongate support serves to restrain the transverse link from moving in a direction, typically a vertical direction, which is perpendicular to a plane containing the walkway surface. Thus instead of the transverse link being secured to a second connector which in turn is secures to the second elongate support, the transverse link may be secured directly to the second elongate support, for example either by means of fasteners, such as a screw or bolt, or by means of a mechanical interlock.

The second connector optionally may be a component which is may be similar or identical to the first connector whereby it is able to provide support for a handrail post such that handrails may the be provided along each side of the walkway.

Accordingly it is to be understood that, by the provision of a first connector which rigidly interconnects a handrail post and a transverse link, any sideways load applied to a handrail to tend to cause sideways movement of the handrail is resisted by both of the elongate tread module supports. Thus even though a first connector may be secured to a lightweight elongate tread module support that has a low torsional stiffness (about an axis extending in the direction of the length of the elongate support) the provision of the transverse link attached to the other elongate support, and which loads the other elongate support typically in a vertical direction, without imposition of a torsional load to that other elongate support, ensures that the first (and also the second) elongate support is not subject to any unacceptable torsional load. Thus the post and associated handrail is better able to resist sideways deflection when loaded in a sideways direction than if secured to only one elongate support.

The first connector may comprise two socket formations each for receiving and securing a respective one of a handrail post and an end region of the transverse link, for example an end region of one of a tube or rod of a transverse link.

The first connector additionally may comprise a flange formation which defines a flange surface that faces in the same direction as the longitudinal axis of one of the socket formations, for example the socket formation for receiving a transverse link, whereby the connector may be firmly secured to a surface, such as a side surface, of an elongate tread module support. The flange section may be planar or may have a contour which is complimentary to that of a confronting surface of the elongate support.

The two socket formations may comprise bores which interconnect with one another. Preferably, however, the socket formation for the transverse link is a blind bore. The socket formation for the handrail post may be a blind bore or a through bore, and, in use of the connector the socket formation for the post may extend lengthwise both above and below the longitudinal axis of a socket formation of the transverse link. The longitudinal axes of the two socket formations may extend in directions perpendicular to one another.

A connector, whether a first or second connector, may comprise an apertured flange for receiving a retainer, such as a bolt or grub screw, for attachment of the connector to an elongate support, for example by a clamping action.

Alternatively it may be provided with retention surfaces that interlock with complimentary surfaces of an elongate support.

Suitable materials for first and second connector components include materials such as extruded or cast aluminium, malleable cast iron, ductile cast iron, and steel, or plastics such as polyamide and moulded reinforced plastics materials such as glass reinforced polyamide and nylon.

The present invention is particularly suitable for providing a walkway installation comprising a handrail assembly and a walkway assembly wherein the walkway assembly is of a type such as that described in the specification of our UK patent publication GB 2475914A.

The walkway assembly may be of a type comprising a plurality of tread modules which may be of a non-metallic composite material and of a lower stiffness than if formed from metallic material. The walkway assembly may comprise lightweight aluminium elongate extrusions to support the tread modules and the extrusions may be of a cross sectional shape that defines at least in part one open sided cavity region which enables a handrail post connector to be secured thereto by a clamping action and without the need for on site drilling of metal during installation of the walkway.

The walkway assembly may comprise other features as described in more detail in the specification of GB 2475914A.

The walkway assembly may comprise tread modules of the type described in the specification of our UK patent publication GB 2478564A.

Although it is convenient, especially for ease of installation, to provide a first connector in the form of a component which comprises a socket formation which locates and rigidly interconnects both a transverse link and a handrail post, in an alternative embodiment the connector may comprise only one socket formation and means, such as a retention flange, for securing to an elongate tread module support. In that case one of the post and transverse link is secured to the socket formation of the connector and the other is provided with an auxiliary connector whereby an end region of, for example, a transverse link is secured to a post or, for example, a post is secured to a transverse link.

In a walkway installation of a type wherein the walkways assembly comprises spaced apart tread modules, one or more transverse links may extend across the walkway assembly at a position above the elongate tread module supports, the or each to lie between spaced apart tread modules. Alternatively one or more transverse links may extend across the walkway assembly at a position underneath the elongate tread module supports.

BRIEF DESCRIPTION OF THE DRAWINGS

Embodiments of the present invention will now be described, by way of example, with reference to the accompanying diagrammatic drawings in which:—

FIG. 13 is a perspective view of part of a walkway installation comprising a handrail assembly in accordance with a second embodiment of the invention.

DESCRIPTION OF THE PREFERRED EMBODIMENTS

Figure 1:
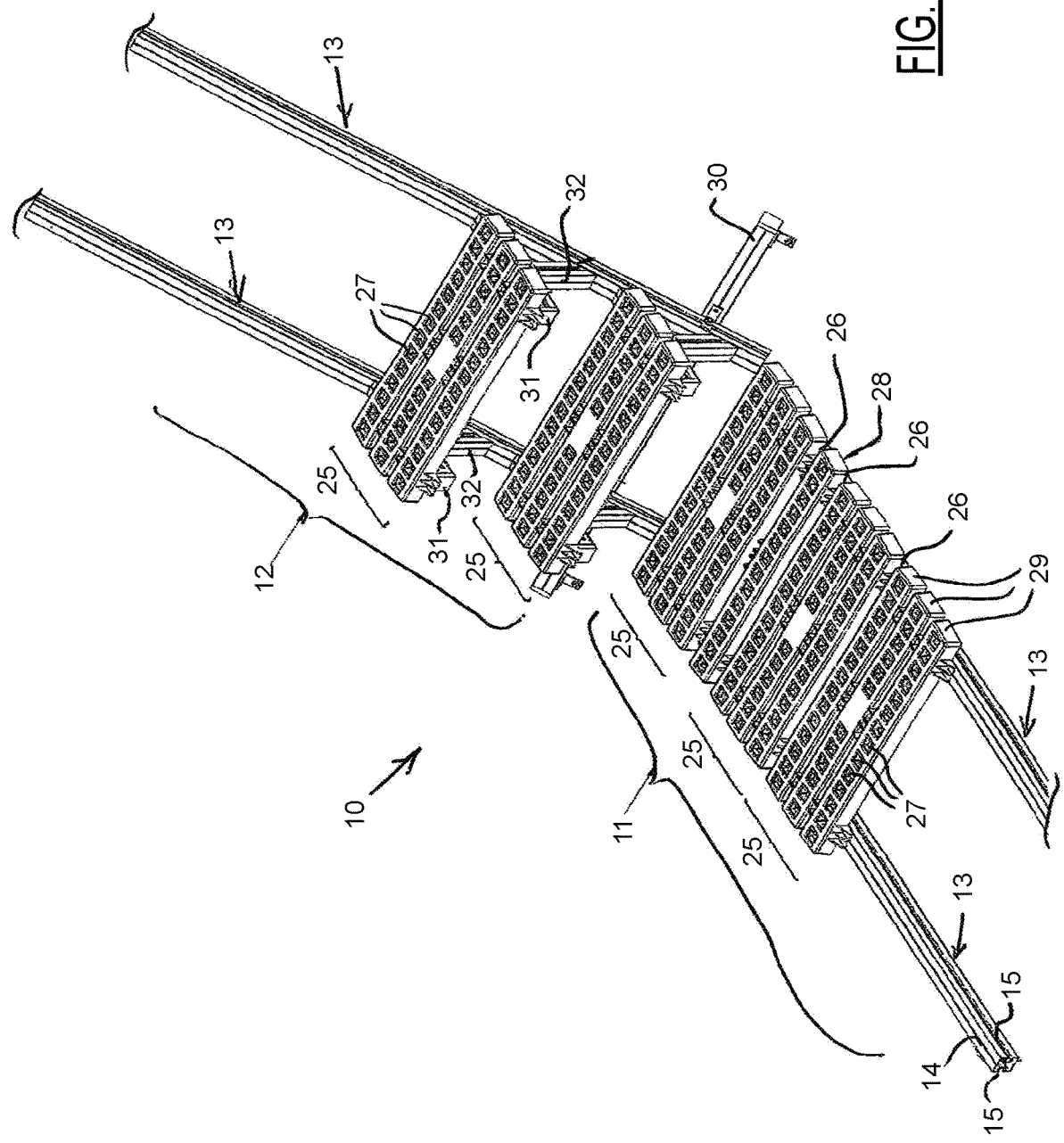
FIG. 1 is a perspective view of part of a walkway assembly known per se and of a type to which a handrail assembly may be secured to provide a walkway installation.

A walkway assembly 10 for securing to a roof structure of the type comprising a flat section and an inclined section comprises a horizontal walkway assembly section 11 and a stairway assembly section 12.

The walkway and stairway assemblies 11, 12 each comprise a pair of mutually parallel elongate primary support members each in the form of a beam 13, the two support beams lying side by side in spaced apart relationship.

Each beam 13 (see FIG. 2) is an aluminium extrusion comprising an upper support surface 14 and a pair of side face walls 15 each of which is grooved such that in each side wall there is an opening 16 to a substantially C shaped retention channel 17 as viewed in transverse cross-section.

The channels 17 in each side face are of the same cross-sectional shape and comprise a pair of abutment surfaces 18 disposed respectively above and below the opening 16. The cross-section of each channel departs from an exact C shape in that the channel has upper and lower recess regions 19 whereby, for a purpose described below, a rectangular-section plate may locate and be supported in upright manner in the channel. Additionally the base region 20 of each channel defines a recess and the base region 20 or channel 17 may accommodate the head of a bolt that extends outwards through the opening 16, and may act to prevent rotation of the bolt head. Conversely the base region channel 17 may non-rotatably locate a nut into which a bolt may be fitted from externally of the beam.

In the case of a roof or other support structure that comprises a rib formation, such as a standing seam, the beams may each be secured to the roof by clamps (not shown) having a hook shaped end that fits in the beam opening 16 thereby to secure the beam against the flange formation when a nut is tightened to draw the clip towards the flange formation.

In the case of a roof structure having a surface to which a retainer bracket (not shown) may be bolted, the channel 17 of a beam may be used non-rotatably to locate a bolt that extends outwards and through one limb of an L shaped bracket to enable the bracket to be bolted firmly to the beam. The other limb of the bracket may be formed with an opening to enable the bracket to be secured by a bolt or self tapping screw to the roof structure.

Prior to or, or optionally, after securing the beam sections to a roof or other support structure tread modules 25 (see FIG. 1) are secured to the upper surfaces 14 of the beams by means of self tapping screws which locate in recesses in the tread modules. These tread modules may, for example, be of the kind described in our aforementioned UK patent publication GB 2478564A, and also described in detail below.

For the horizontal walkway section 11 the tread modules define a substantially level tread surface, but successive modules are spaced apart to define gaps 26 which (particularly on an outdoor walkway) provide drainage in addition to drainage facilitated by apertures 27 in the tread modules. Not all modules are necessarily of the same size and FIG. 1 shows a small module 28 formed by severing one of three regions 29 of a module from the other two sections by cutting of interconnecting webs 22 (see FIG. 3).

Figure 3:
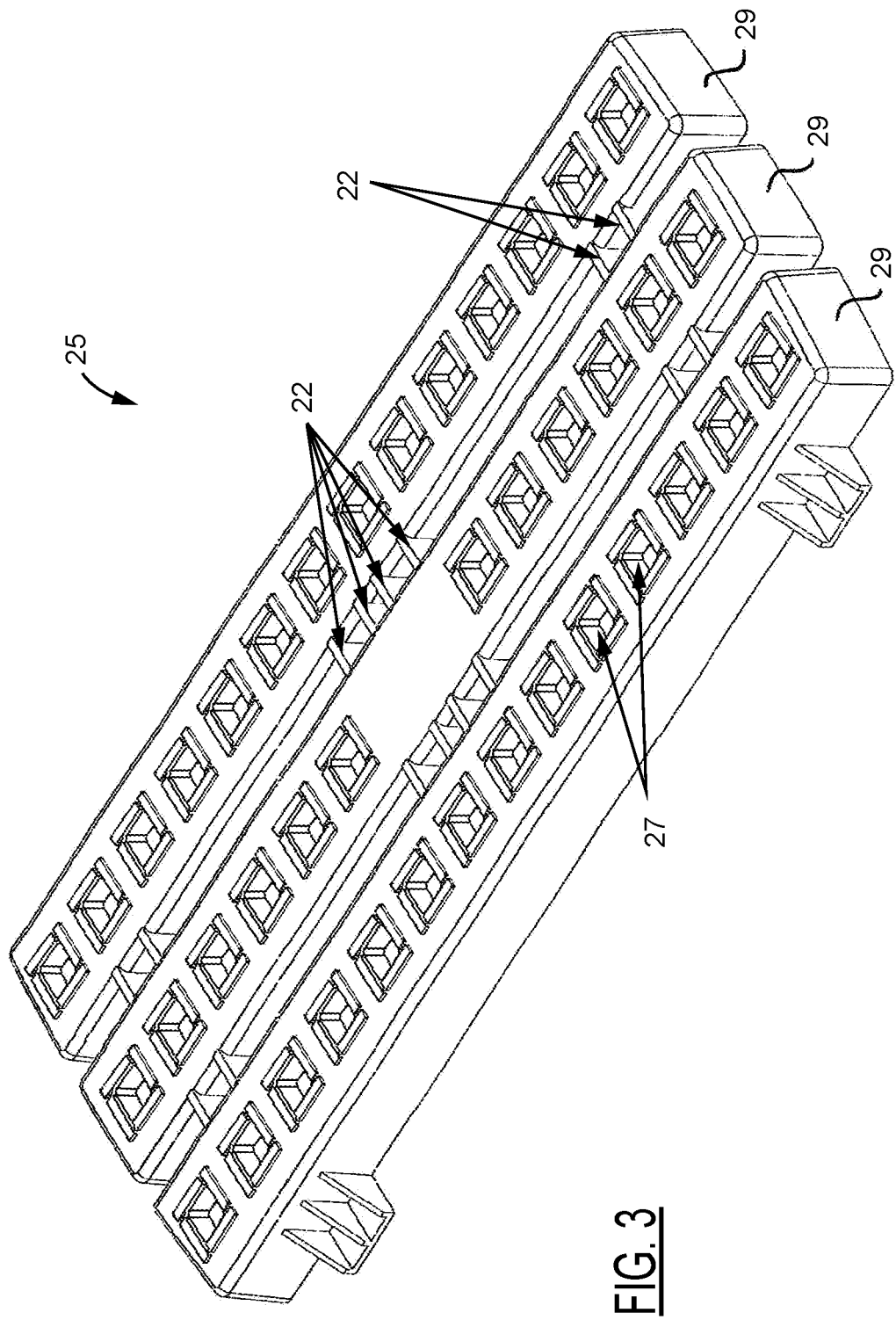
FIG. 3 is a perspective view of a tread module of the walkway assembly of FIG. 1.

Typically, as also shown in GB 2478564 and the FIGS. 1 and 3 of this specification, the longer edges of each module are formed with integral spacer formations 24 to assist in maintaining adjacent modules slightly spaced apart to provide the gaps 26.

The stairway assembly section 12 comprises a pair of spaced apart beams 13 secured to the inclined surface of the roof structure by transversely extending bars 30 which are seamed to the roof structure.

For each tread position of the stairway assembly section (see FIG. 1) each beam 13 has an auxiliary support beam 31 secured thereto. Each auxiliary beam is secured pivotally relative to a support beam 13 by means of a hinge (not shown) and is held in position to maintain the tread module horizontally by means of a spacer post 32 secured by self-tapping screws respectively to an upper surface 14 of a beam 13 and underside surface 33 of the auxiliary beam 31.

Figure 2:
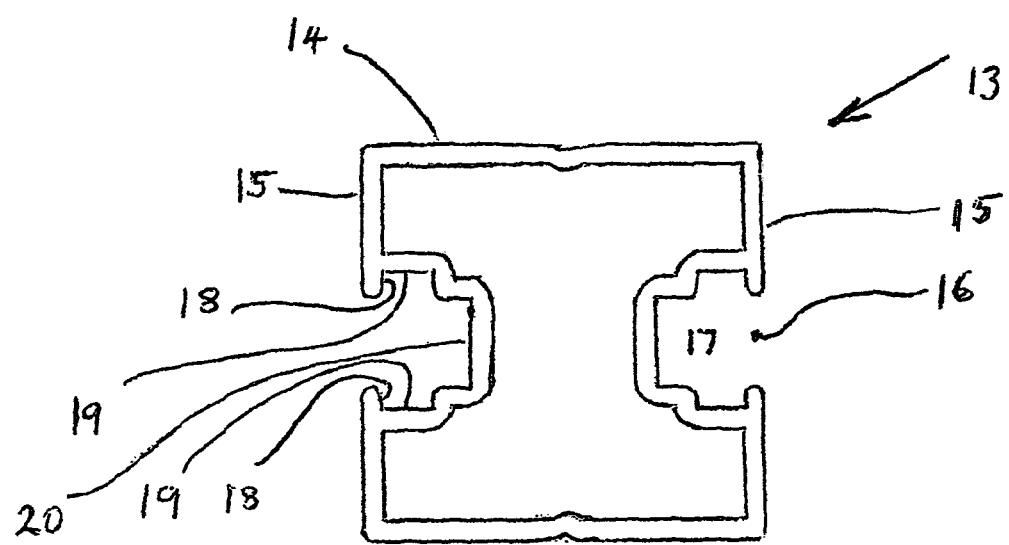
FIG. 2 is a an end view of one of the elongate supports of FIG. 1.
Figure 4:
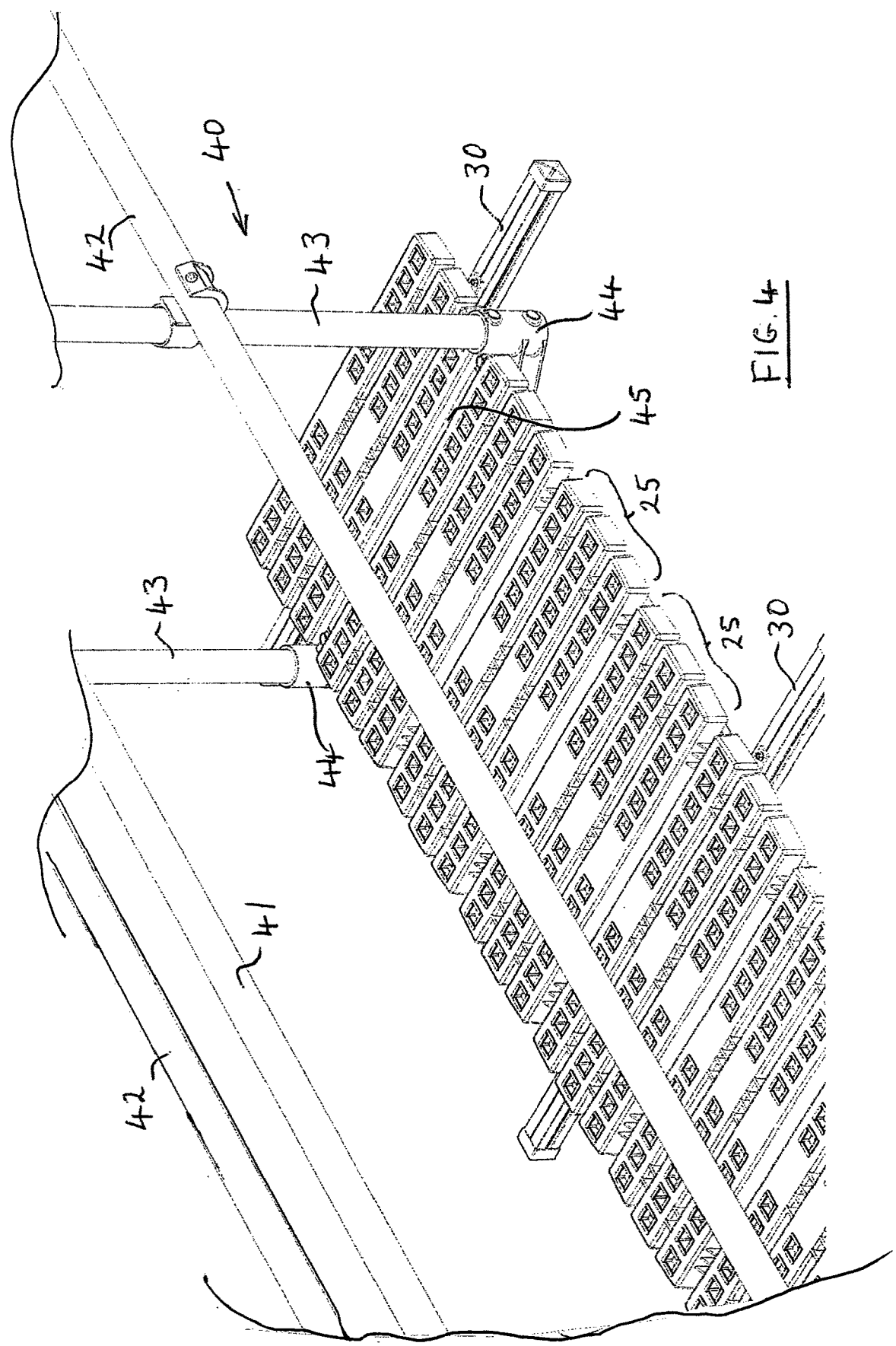
FIG. 4 is a perspective view of part of a walkway installation in accordance with the present invention.
Figure 5:
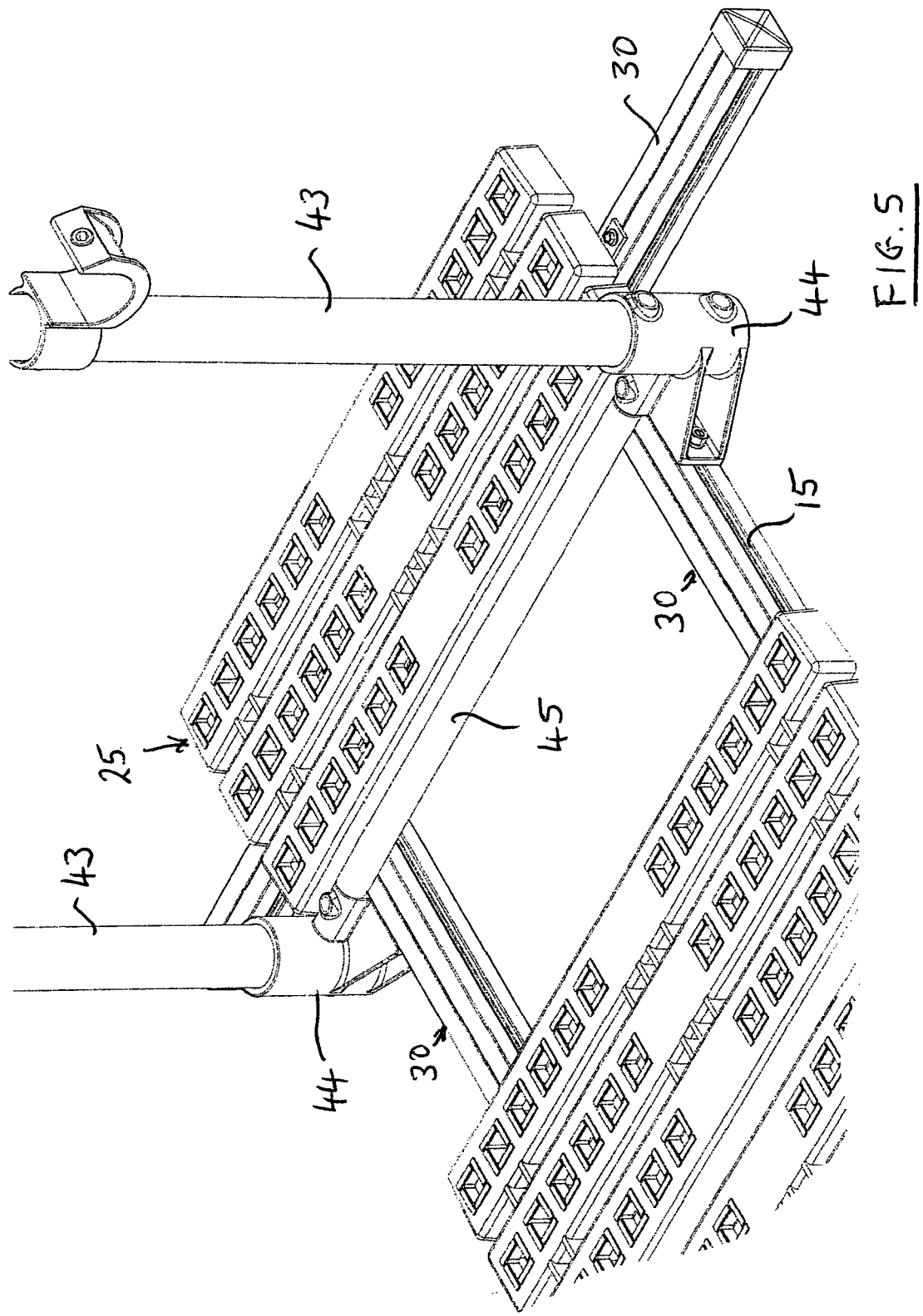
FIG. 5 shows part of the view of FIG. 4 with one of the tread modules removed.
Figure 6:
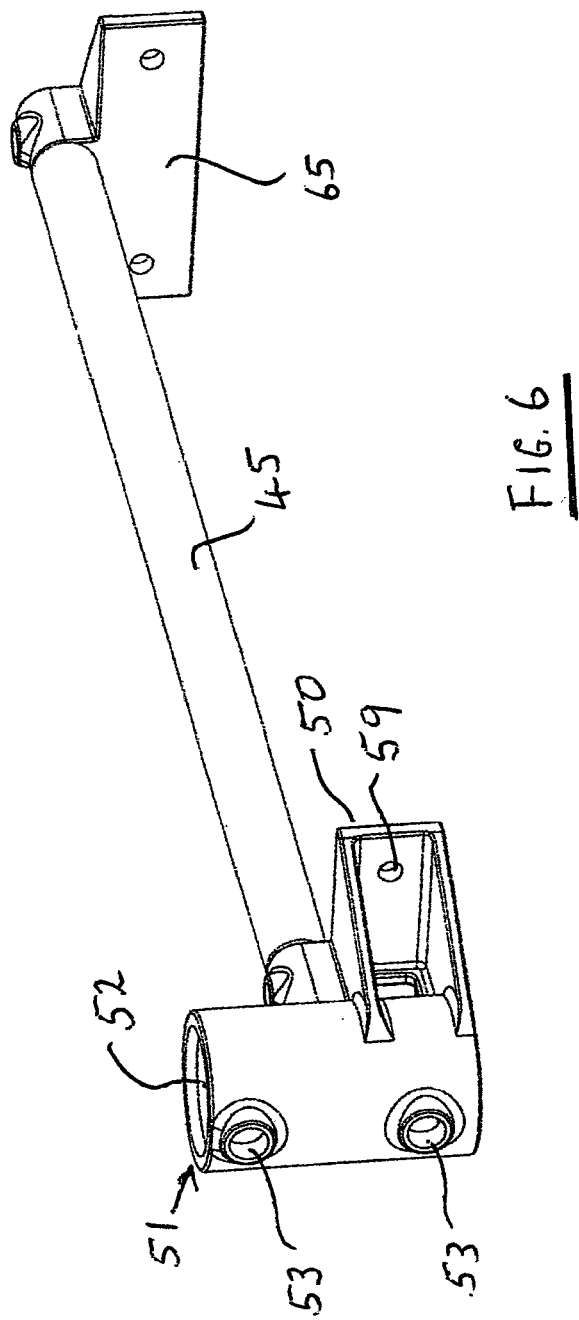
FIG. 6 is a perspective view of part of a handrail which is a modification of the handrail shown in FIGS. 4 and 5.

A walkway installation comprising the walkway assembly 10 of FIGS. 1 to 3 and a handrail assembly 40 is shown in part in FIGS. 4 and 5.

The handrail assembly 40 of this embodiment of the invention is of a type which provides a handrail along each side of the walkway. The handrail assembly 40 comprises at each side of the walkway a handrail 41, and an intermediate safety barrier bar 42 that extends parallel with the handrail 41, a plurality of posts 43 to maintain the handrail 41 and barrier 42 spaced above the walkway tread modules 25, and handrail connectors 44 by means of which posts are secured to a side face 15 of one of the elongate support beams.

The handrail assembly additionally comprises a transversely extending rod 45 that is positioned to extend across the walkway, positioned in the gap 26 (see FIG. 1) between adjacent tread modules 25. For location of a module between a pair of tread modules the edge spacers 24 may, if necessary, be removed.

The rod 45 rigidly interconnects a pair of connectors 44 at respective sides of the walkway whereby the connectors maintain a fixed angle, typically a right angle, between the longitudinal axes of the rod 45 and a respective post 43. In consequence of that rigid interconnection between a post and the transverse rod 45 as secured to each of the beams 13 any sideways force applied to a handrail when resisting toppling of personnel is resisted by both of the beams and in particular by the resistance to upwards movement of the beam at that side of the walkway opposite that of the post to which sideways loaded handrail is located.

In some walkway installations there may be a requirement for a handrail at only one side of a walkway. Accordingly in a modification of the embodiment as shown in FIGS. 1 and 5, one of the connectors 44 may be replaced by a connector 65 (see FIGS. 6 and 10 to 12) which enables only the transverse rod 45 to be connected to a beam 13.

Figure 7:
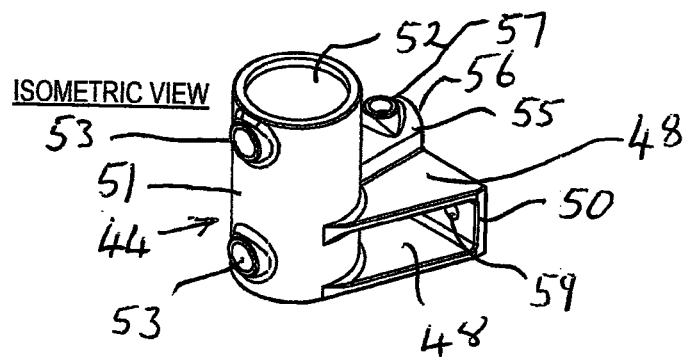
FIG. 7 is an isometric view of a first of the connectors of FIG. 6.
Figure 8:
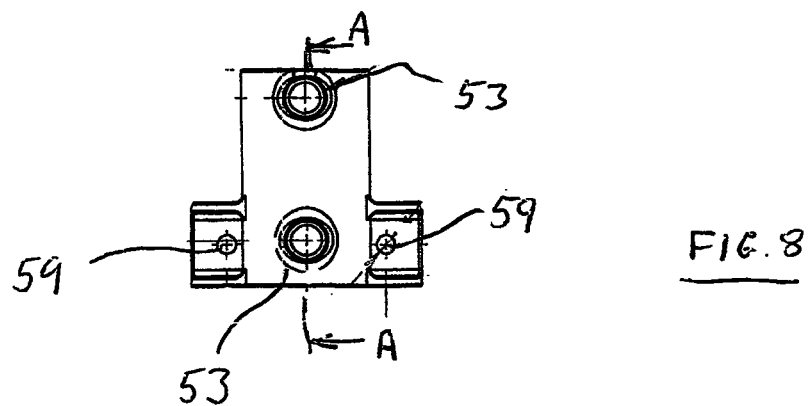
FIG. 8 is a view in the direction X of FIG. 7.
Figure 9:
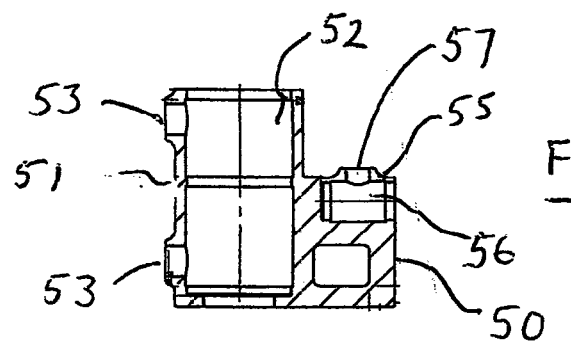
FIG. 9 is a cross-section on the plane A-A of FIG. 8.
Figure 10:
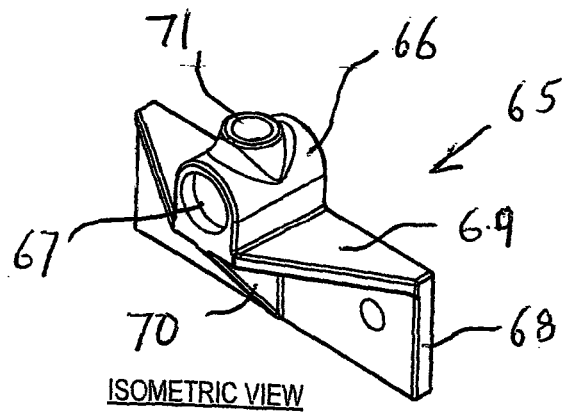
FIG. 10 is an isometric view of a second of the connectors of FIG. 6.
Figure 11:
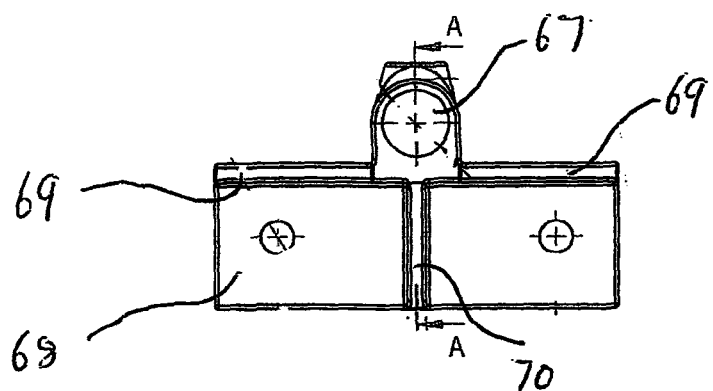
FIG. 11 is a view in the direction of the arrow Y of FIG. 10.
Figure 12:
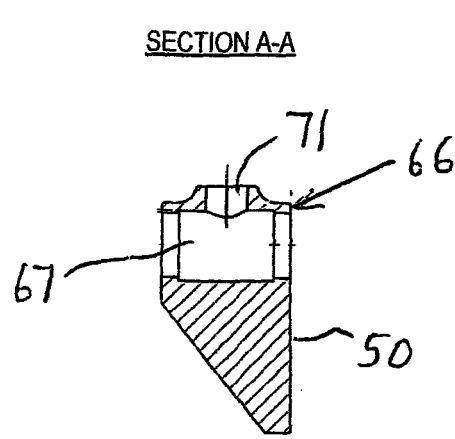
FIG. 12 is a cross-section in the plane A-A of FIG. 11.

The handrail connector 44 will now be described in more detail with reference to FIGS. 7 to 9. The connector 44 may be a malleable cast iron casting or an aluminium casting. The connector may comprises a planar flange 50 integral with a socket 51 in the form of a through-bore 52 the longitudinal axis of which extends parallel with the face of the flange 50. Two screw threaded apertures 53 extend to the through-bore whereby a grub screw may be provided in each aperture to engage with and secure the end of a metal rod that serves as a post 43 of the handrail assembly.

The connector 44 additionally comprises a socket 55 which defines a blind bore 56 the longitudinal axis of which extends perpendicular to the face of the through-bore. The open end of the blind bore 56 faces in the same direction as the face of the flange, away from the through-bore 52. A screw threaded aperture 57 extends to the blind bore whereby a grub screw may be provided in the aperture to engage with and secure an end of a transverse bar 45.

The flange is supported by reinforcing ribs 48 and comprises apertures 59 whereby a bolt may be employed to extend through an aperture 59 and opening 16 of a beam 13 to engage with a nut non-rotatably positioned and supported within the beam 17 thereby to clamp the connector 44 to a side face 15 of the beam as the bolt head is rotated.

In use the connector 44 may be orientated in the manner shown in FIGS. 4 and 5 to secure a transverse link 45 which extends across the walkway in a space 26 between two successive tread modules 25. However, because the socket 51 for securing a post is a through-bore the connector may readily be employed in an inverted orientation thereby to secure a transverse link which extends across the walkway positioned beneath the beams 13 if those beams are spaced sufficiently above a roof or other support structure.

If a handrail is required at only one side of a walkway, a connector at the other side of the walkway may be identical to the connector which supports a post but with the through-bore left vacant. Alternatively, however, that other side of the walkway may be provided with a connector 65 of the type shown in FIGS. 6 and 10 to 12. This comprises a single socket formation 66 which defines a through-bore 67 supported relative to a flange 68 by reinforcing ribs 69,70. A screw threaded aperture 71 extends to the through-bore thereby to enable use of a grub screw to secure a transverse bar within the socket 66.

In another embodiment of the present invention (see FIG. 13) a handrail assembly 75 comprises a connector 76 which has a socket formation 77 for locating a vertically extending post 78, but is devoid of a socket formation for locating an end region of a transverse link. In this assembly the end of the transverse link 79 is provided with an end fitting 80 having a blind bore 81 within which the end of the transverse link may be secured and, at right angles to that blind bore, a through bore 82 within which the post 78 extends, the through-bore comprising a screw threaded aperture whereby a grub screw may be employed to secure the connector 76 and thus the transverse link 79 relative to the post 78.

From the foregoing it is to be understood that the present invention provides a connector and a handrail assembly for attachment to a walkway assembly and which facilitates firm location of a handrail to resist sideways movement without potentially imposing a high and localised torsional load on the walkway assembly.

The invention claimed is:

1. A walkway installation, comprising:

a walkway assembly which comprises at least one tread module supported by a pair of spaced apart elongate supports which extend in a direction of a length of the walkway installation; and a handrail assembly comprising a handrail which extends in the direction of the length of the walkway assembly and a plurality of spaced apart posts which each secure the handrail relative to the walkway assembly, the handrail assembly additionally comprising a first connector which secures a post to a first side of the walkway assembly and said first connector having secured thereto a substantially inflexible transverse link which extends across the walkway assembly in a direction perpendicular to the length of the walkway installation, said first connector comprising two socket formations each for receiving and securing a respective one of the handrail post and an end region of the transverse link, and said transverse link extending to a second connector secured to a second side of the walkway, wherein the first connector is a component which is secured directly to a first of the elongate supports.

2. The walkway installation according to claim 1, wherein the second connector is a component which is secured directly to a second of the elongate supports.

3. The walkway installation according to claim 2, wherein the second connector provides support for a handrail post at said second side of the walkway.

4. The walkway installation according to claim 1, wherein the second of the elongate supports is adapted to serve as a second connector whereby the transverse link is secured directly to said second elongate support.

5. The walkway installation according to claim 1, wherein the first connector additionally comprises a flange formation having a flange surface that faces in the same direction as the longitudinal axis of the socket formation in which the transverse link is located.

6. The walkway installation according to claim 1, wherein the socket formation for the post extends lengthwise above and below the longitudinal axis of the socket formation for the transverse link.

7. The walkway installation according to claim 1, wherein the two socket formations comprise bores which interconnect with one another.

8. The walkway installation according to claim 1, wherein the socket formation for the transverse link is a blind bore.

9. The walkway installation according to claim 1, wherein the socket formation for the handrail post is a through-bore.

10. The walkway installation according to claim 1, wherein the connector comprises an apertured flange for receiving a retainer for attachment of the connector to one of the elongate supports.

11. The walkway installation according to claim 1, wherein the elongate supports are of a cross-sectional shape that defines at least in part one open sided cavity region whereby a handrail post connector is secured to the elongate extrusion by a clamping action.

12. The walkway installation according to claim 1, further comprising:

a plurality of spaced apart tread modules, wherein the transverse link extends across a walkway assembly at a position above the elongate tread module supports and between two spaced apart tread modules.

13. A connector for location of the support posts of a walkway handrail assembly, said connector comprising:

two socket formations each for securing a respective one of a handrail post and an end of a link which, in use, extends transversely across the walkway, the connector comprising an integral formation of said two socket formations and a flange formation, said socket for receiving the transverse link extending between the flange formation and the socket for receiving a handrail post, and said flange formation defining a flange surface which faces in the same direction as the direction of the open end of the socket formation for receiving the transverse link, the connector further comprising a reinforcing rib which is integral with and extends between the flange formation and the two socket formations.

14. The connector according to claim 13, wherein the socket formation for a transverse link is a blind bore and the socket formation for a handrail post is a through bore.

15. The connector according to claim 13, wherein the flange formation is apertured for receiving a retainer for attachment of the connector to a support.

16. The connector according to claim 13, wherein the flange formation is provided with retention surfaces adapted to be able to interlock with complementary surfaces of an elongate support.

17. The connector according to claim 13, further comprising:

two said reinforcing ribs, wherein the two reinforcing ribs are spaced apart in the direction of the longitudinal axis of the socket formation for securing a handrail post.

18. A walkway installation comprising:

a walkway assembly which comprises at least one tread module supported by a pair of spaced apart elongate supports which extend in the direction of the length of the walkway installation, the walkway installation additionally comprising a handrail assembly comprising a handrail which extends in the direction of the length of the walkway assembly and a plurality of spaced apart posts which each secure the handrail relative to the walkway assembly, the handrail assembly additionally comprising a first connector which secures a post to a first side of the walkway assembly and said first connector having secured thereto a substantially inflexible transverse link which extends across the walkway assembly in a direction perpendicular to the length of the walkway installation, wherein said transverse link extending to a second connector secured to a second side of the walkway, and wherein the first connector is a component which is secured directly to a first of the elongate supports.

19. A walkway installation, comprising:
a walkway assembly which comprises a plurality of tread modules supported by a pair of spaced apart elongate supports which extend in the direction of the length of the walkway installation,
the walkway installation additionally comprising a handrail assembly comprising a handrail which extends in the direction of the length of the walkway assembly and a plurality of spaced apart posts which each secure the handrail relative to the walkway assembly,
the handrail assembly additionally comprising a first connector which secures a post to a first side of the walkway assembly and said first connector having secured thereto a substantially inflexible transverse link which extends across the walkway assembly in a direction perpendicular to the length of the walkway installation,
said transverse link extending to a second connector secured to a second side of the walkway,
wherein at least two tread modules are spaced apart and wherein the transverse link extends across the walkway at a position above the elongate tread modules supports and between said two spaced apart tread modules.

20. A walkway installation, comprising:
a walkway assembly which comprises at least one tread module supported by a pair of spaced apart elongate supports which extend in a direction of a length of the walkway installation; and
a handrail assembly comprising a handrail which extends in the direction of the length of the walkway assembly and a plurality of spaced apart posts which each secure the handrail relative to the walkway assembly,
the handrail assembly additionally comprising a first connector which secures a post to a first side of the walkway assembly and said first connector having secured thereto a substantially inflexible transverse link which extends across the walkway assembly in a direction perpendicular to the length of the walkway installation,
said first connector comprising two socket formations each for receiving and securing a respective one of the handrail post and an end region of the transverse link,
said transverse link extending to a second connector secured to a second side of the walkway,
and the walkway installation further comprising a plurality of spaced apart tread modules, wherein the transverse link extends across a walkway assembly at a position above the elongate tread module supports and between two spaced apart tread modules.

* * * * *